(12) United States Patent
Huang et al.

(10) Patent No.: US 10,114,800 B1
(45) Date of Patent: Oct. 30, 2018

(54) LAYOUT RECONSTRUCTION USING SPATIAL AND GRAMMATICAL CONSTRAINTS

(71) Applicant: Intuit Inc., Mountain View, CA (US)

(72) Inventors: Nankun Huang, San Diego, CA (US); Carol A. Howe, San Diego, CA (US); Christopher M. Dye, San Diego, CA (US); Robert Bamford, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 244 days.

(21) Appl. No.: 14/098,308

(22) Filed: Dec. 5, 2013

(51) Int. Cl.
*G06F 17/21* (2006.01)

(52) U.S. Cl.
CPC ................... *G06F 17/212* (2013.01)

(58) Field of Classification Search
CPC ...................................................... G06F 17/212
USPC ......................................................... 715/243
See application file for complete search history.

(56) References Cited

U.S. PATENT DOCUMENTS

| | | | | | |
|---|---|---|---|---|---|
| 5,721,940 | A * | 2/1998 | Luther | .................. | G06F 17/243 715/200 |
| 7,840,891 | B1 * | 11/2010 | Yu | ....................... | G06F 17/2288 715/223 |
| 8,261,186 | B2 * | 9/2012 | Mansfield | ............. | G06F 17/211 715/234 |
| 8,885,951 | B1 * | 11/2014 | Cristofano | ......... | G06K 9/00449 382/173 |
| 2002/0159639 | A1 * | 10/2002 | Shima | ................ | G06K 9/00449 382/218 |
| 2005/0235202 | A1 * | 10/2005 | Chen | ..................... | G06F 17/211 715/248 |
| 2007/0033118 | A1 * | 2/2007 | Hopkinson | ........... | G06F 17/243 705/31 |
| 2007/0061319 | A1 * | 3/2007 | Bergholz | ............. | G06F 17/3071 |
| 2007/0256010 | A1 * | 11/2007 | Blackmon | ............. | G06F 17/212 |
| 2008/0267505 | A1 * | 10/2008 | Dabet | ................... | G06F 17/243 382/181 |
| 2009/0148039 | A1 * | 6/2009 | Chen | .................. | H04N 1/40062 382/165 |

(Continued)

OTHER PUBLICATIONS

Xiang, Shiming, Feiping Nie, and Changshui Zhang. "Learning a Mahalanobis distance metric for data clustering and classification." Pattern Recognition 41, No. 12 (2008): 3600-3612.*

(Continued)

*Primary Examiner* — Frank D Mills
(74) *Attorney, Agent, or Firm* — Patterson & Sheridan LLP

(57) ABSTRACT

During an image-analysis technique, the system calculates features by performing image analysis (such as optical character recognition) on a received image of a document. Using these features, as well as spatial and grammatical constraints, the system determines a layout of the document. For example, the layout may be determined using constraint-based optimization based on the spatial and the grammatical constraints. Note that the layout specifies locations of content in the document, and may be used to subsequently extract the content from the image and/or to allow a user to provide feedback on the extracted content by presenting the extracted content to the user in a context (i.e., the determined layout) that is familiar to the user.

20 Claims, 5 Drawing Sheets

(56) References Cited

U.S. PATENT DOCUMENTS

| | | | | |
|---|---|---|---|---|
| 2010/0161460 A1* | 6/2010 | Vroom | ................. | G06Q 40/123 |
| | | | | 705/31 |
| 2011/0249905 A1* | 10/2011 | Singh | ................. | G06K 9/00449 |
| | | | | 382/225 |
| 2011/0258195 A1* | 10/2011 | Welling | ............. | G06K 9/00442 |
| | | | | 707/740 |
| 2012/0027246 A1* | 2/2012 | Tifford | ................... | G06Q 40/00 |
| | | | | 382/100 |
| 2014/0108456 A1* | 4/2014 | Ramachandrula | ........................... | |
| | | | | G06F 17/30247 |
| | | | | 707/779 |
| 2014/0245122 A1* | 8/2014 | Oro | ..................... | G06F 17/2785 |
| | | | | 715/230 |

OTHER PUBLICATIONS

Alahi et al., "Freak: Fast retina keypoint." In Computer vision and pattern recognition (CVPR), 2012 IEEE conference on, pp. 510-517. IEEE, 2012 (Year: 2012).*

* cited by examiner

LAYOUT RECONSTRUCTION USING SPATIAL AND GRAMMATICAL CONSTRAINTS

CROSS-REFERENCE TO RELATED APPLICATION

This application is related to U.S. Non-Provisional application Ser. No. 14/098,319, entitled "Streamlined Data Entry Based on Data Relationships," by Clarence Huang, Carol Howe, Christopher Dye and Bob Bamford, filed on Dec., 5 2013, the contents of which are herein incorporated by reference.

BACKGROUND

The present disclosure relates to a technique for determining the layout of information in a document. More specifically, the present disclosure relates to a technique for simplifying data entry by determining a layout of a document using spatial and grammatical constraints for the information in the document.

Many software applications require users to provide an image document that is processed to extract information for use by the software application.

However, extracting the information from the image can be difficult. As a consequence, there may be errors in the extracted information. To address this problem, the user is often asked to confirm the accuracy of the extracted information. For example, the extracted information may be presented to the user in tabular form. The context of the information in the original document is lost in this tabular form, which may make it difficult for the user to compare the extracted information to the information in the original document. Consequently, this approach to data-entry and verification can be time-consuming and prone to error.

SUMMARY

The disclosed embodiments relate to a computer system that determines a layout of information in a document. During operation, the computer system receives an image of the document. Then, the computer system performs image analysis on the image to calculate features. Next, the computer system determines the layout of the document based on the calculated features, as well as spatial constraints and grammatical constraints, where the layout specifies locations of content in the document.

Note that the image analysis may include optical character recognition.

Moreover, determining the layout may involve constraint-based optimization based on the spatial constraints and the grammatical constraints. Furthermore, determining the layout may involve calculating a distance metric based on the spatial constraints and the grammatical constraints. For example, the distance metric may include a Mahalanobis distance metric.

Additionally, the document may include an income-tax document, where the spatial constraints are associated with boxes in the income-tax document, and the grammatical constraints are associated with alphanumeric characters proximate to the boxes.

In some embodiments, after determining the layout, the computer system extracts the content from the image based on the determined layout. After extracting the content, the computer system may populate fields in a form based on the extracted content, and may present the form with the determined layout. Alternatively, the computer system may: receive the content associated with the document from the user; populate fields in the form with the content; and present the form with the determined layout.

Furthermore, prior to performing image analysis, the computer system may receive an identifier of the user. Then, the computer system may select an initial layout of the document based on the identifier, where the spatial constraints and the grammatical constraints are associated with the initial layout. Thus, the initial layout may be used when determining the layout. Alternatively, the computer system may use the identifier of the user to look up the image, such as an image of a previous version of the document.

Additionally, after determining the layout, the computer system may request feedback from a user about the determined layout, and may receive the feedback from the user.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for determining a layout of information in a document, and a computer-program product (e.g., software) for use with the computer system are described. During this image-analysis technique, features are calculated by performing image analysis (such as optical character recognition) on a received image of the document. Using these features, as well as spatial and grammatical constraints, the layout of the document is determined. For example, the layout may be determined using constraint-based optimization based on the spatial and the grammatical constraints. Note that the layout specifies locations of content in the document, and may be used to subsequently extract the content from the image and/or to allow a user to provide feedback on the extracted content by presenting the extracted content to the user in a context (i.e., the determined layout) that is familiar to the user.

By determining the layout, it may be easier to accurately extract the content and/or to receive feedback about the content from the user. Consequently, the image-processing technique may make data entry based on optical character recognition less time-consuming and more accurate, which may improve the user experience and reduce user frustration. Therefore, the image-analysis technique may improve customer retention and increase sales of software that uses the image-analysis technique and, thus, may increase the revenue of a provider of the image-analysis technique.

In the discussion that follows, a user may include: an individual or a person (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
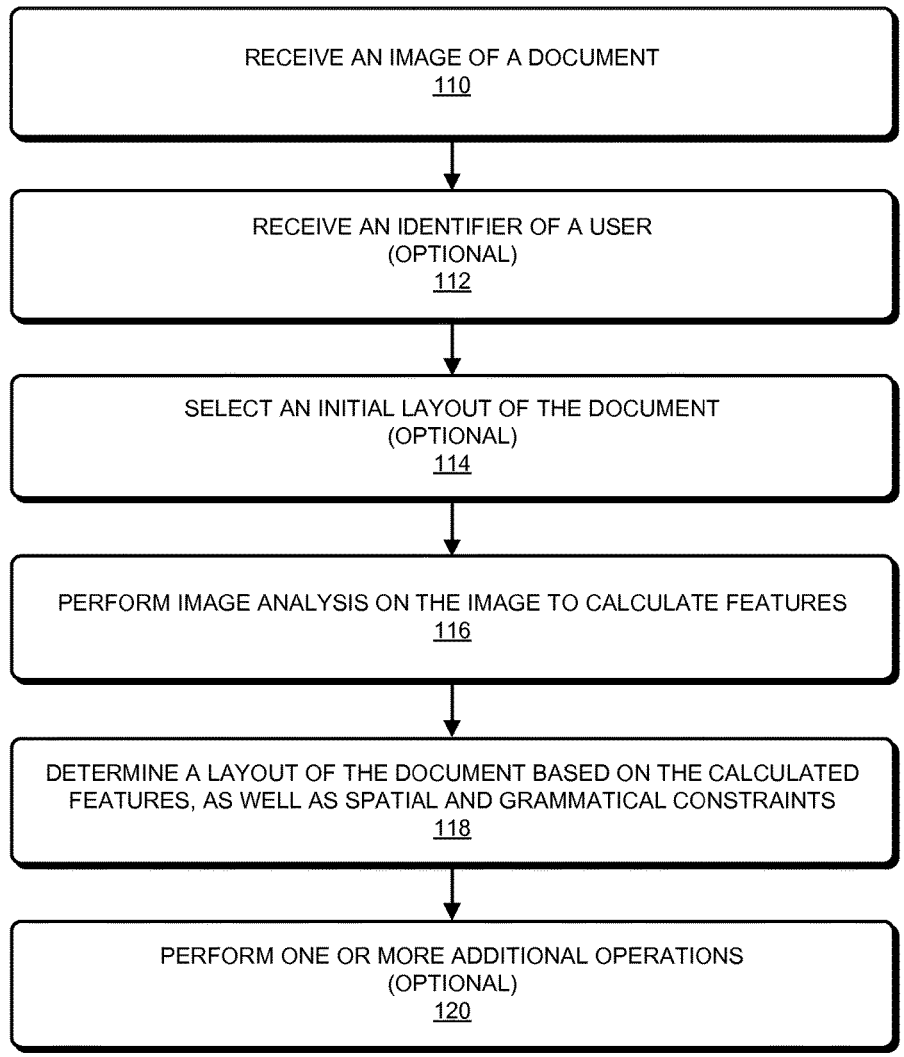
FIG. 1 is a flow chart illustrating a method for determining a layout of information in a document in accordance with an embodiment of the present disclosure.

We now describe embodiments of the image-analysis technique. FIG. 1 presents a flow chart illustrating a method 100 for determining a layout of information in a document, which may be performed by a computer system (such as computer system 500 in FIG. 5). During operation, the computer system receives an image of the document (operation 110). As described further below with reference to FIG. 4, the image may be received from the user or from an application (such as a software application) being used by the user. For example, the user may use the software application to scan or acquire (such as by taking a picture) the image of the document, which is then provided to the computer system. Alternatively, as described further below, an identifier of the user may be used to look up the image, such as an image of a previous version of the document.

Then, the computer system performs image analysis on the image to calculate (or extract) features (operation 116). For example, the image analysis may include optical character recognition. More generally, the image analysis may include intelligent character recognition. In the discussion that follows, 'optical character recognition' should be understood to encompass a variety of machine-learning techniques for extracting content from documents with printed or written alphanumeric characters, including techniques such as 'intelligent character recognition.' Note that the features may include: edges associated with objects, corners associated with objects, lines associated with objects, conic shapes associated with objects, and/or texture associated with objects. In some embodiments, the features are calculated using a description technique, such as: scale invariant feature transform (SIFT), speeded up robust features (SURF), a binary descriptor (such as ORB), binary robust invariant scalable keypoints (BRISK), fast retina keypoint (FREAK), etc.

Next, the computer system determines the layout of the document based on the calculated features, as well as spatial and grammatical constraints (operation 118). As described further below with reference to FIG. 3, the layout specifies locations of content in the document. Moreover, determining the layout may involve constraint-based optimization based on the spatial constraints and the grammatical constraints. Furthermore, determining the layout may involve calculating a distance metric (such as a Mahalanobis distance metric and, more generally, a distance metric that takes into account correlations in the calculated features and that is scale-invariant) based on the spatial constraints and the grammatical constraints.

For example, the document may include an income-tax document (such as a 1099 form or a W2 form) and the spatial constraints may be associated with boxes in the income-tax document, and the grammatical constraints may be associated with alphanumeric characters proximate to the boxes. In particular, the calculated features may be classified to identify: boxes, titles or text proximate to boxes, and paragraphs. The borders of the boxes may be identified using a Mahalanobis distance metric that gauges the similarity of the calculated features in the image with features in a set of documents (such as a set of income-tax documents). Moreover, the spatial relationships in a given document in the set of documents may also be used (which is another spatial constraint). Thus, when a box is identified, the alphanumeric characters proximate or adjacent to the box may be identified as the title for that box based on the possible titles (which are grammatical constraints) in the set of documents. These alphanumeric characters may be associated with known titles in the set of documents using n-gram models. Furthermore, using the known layouts of the set of documents, other boxes and titles may be identified. Thus, when a first box having the title 'box 1' is identified, it may be known that a second box entitled 'box 2' is located to the right of box 1 in several documents in the set of documents. In this way, the spatial and the grammatical constraints may be used to uniquely identify the document and its associated layout.

Alternatively or additionally, prior to performing image analysis (operation 116), the computer system may optionally receive an identifier of the user (operation 112). Then, the computer system may optionally select an initial layout of the document based on the identifier (operation 114), where the spatial and the grammatical constraints are associated with the initial layout. Thus, the initial layout may be used when determining the layout. Alternatively, as noted previously, the computer system may use the identifier of the user to look up the image, such as an image of a previous version of the document (e.g., a version of the document from a previous year, such as a previous year's W2 form).

For example, the user may provide their Social Security number or their Employer Identification Number. Based on this identifier, the initial layout of the document may be inferred or assumed from a prior layout of the document associated with the user. In particular, if the document is a W2 form, the layout of the user's W2 form from one or more previous years may be assumed, and this layout (with the associated spatial and grammatical constraints) may be used as the initial layout when determining the layout of the document for a current year. In this way, the set of documents (which may include a variety of W2 forms having different layouts) may be constrained or simplified based on the initial layout, which may allow the layout to be determined more rapidly and with fewer errors.

In some embodiments, after determining the layout (operation 118), the computer system performs one or more additional operations (operation 120). For example, the computer system may extract the content from the image based on the determined layout. Then, the computer system may populate fields in a form with the extracted content, and may present the form with the determined layout. In particular, as described further below with reference to FIG. 4, the computer system may provide the form to the user. Alternatively, the computer system may: receive the content associated with the document from the user; populate fields in the form with the content; and present the form with the determined layout.

Additionally, after determining the layout (operation 118), the computer system may request feedback from a user about the determined layout, and may receive the feedback from the user. Note that the feedback may be obtained before extracting the content to improve the accuracy of the extracted content.

By presenting the determined layout and/or the extracted content in the form with the determined layout, it may be easier for the user to provide the feedback because the information is in a familiar format, which is the same as it appears in the version of the document that the user possesses. Said differently, the determined layout and/or the extracted content may be presented to the user in context, which may make it easier for the user to assess the accuracy of the determined layout and/or the extracted content.

Once the user has verified the accuracy of the extracted content and/or the determined layout, the extracted content may be used in income-tax documents, e.g., when preparing an income-tax return for the user.

Note that the spatial and the grammatical constraints associated with the document and/or the set of documents may have been predetermined by the computer system prior to method 100. For example, machine-learning techniques may have been applied to the set of documents (such as W2 forms and 1099 forms), and the resulting spatial and grammatical constraints may have been stored in tabular form or in a data structure so the computer system can access this information when determining the layout of the document.

Figure 2:
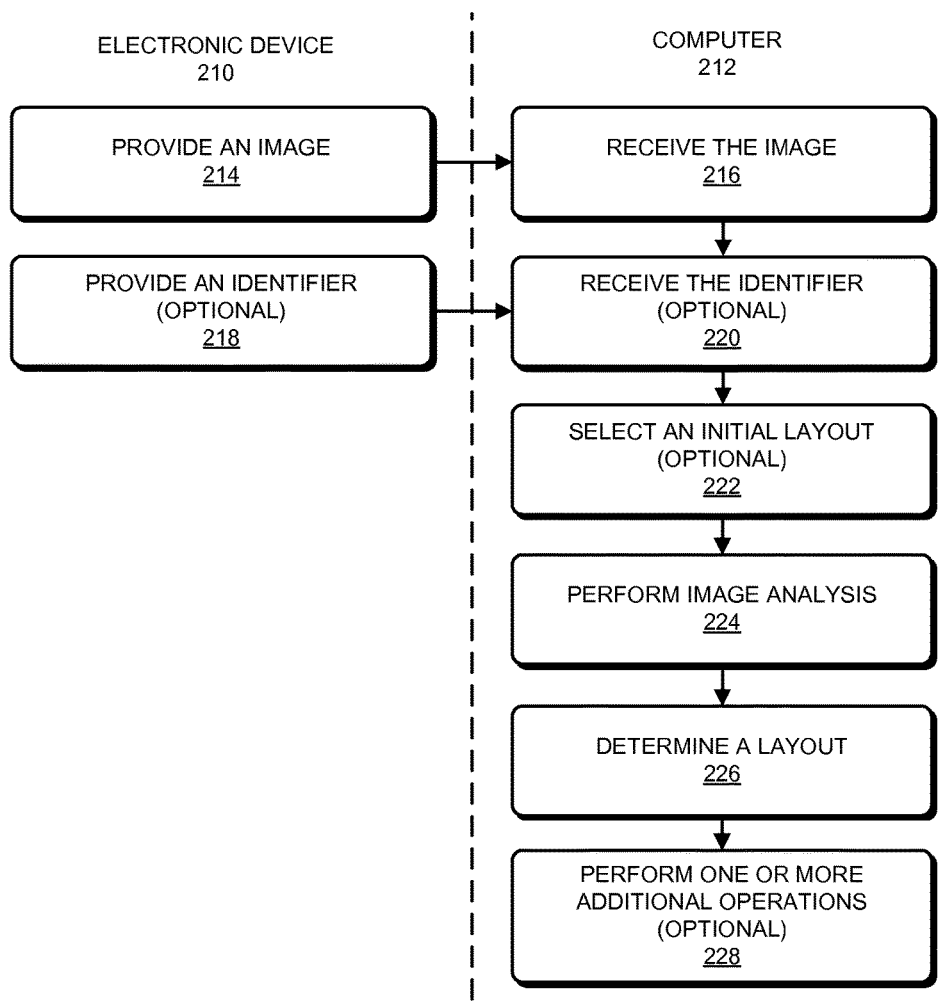
FIG. 2 is a flow chart illustrating the method of FIG. 1 in accordance with an embodiment of the present disclosure.

In an exemplary embodiment, the image-analysis technique is implemented using an electronic device (such as a computer or a portable electronic device, e.g., a cellular telephone) and a computer, which communicate through a network, such as a cellular-telephone network and/or the Internet (e.g., using a client-server architecture). This is illustrated in FIG. 2, which presents a flow chart illustrating method 100 (FIG. 1).

During the method, electronic device 210 provides (operation 214) and computer 212 receives (operation 216) the image of the document. (Alternatively, computer 212 may use the identifier of the user to look up the image.) Then, computer 212 performs image analysis (operation 224) on the image to calculate (or extract) features. For example, the features may be calculated using optical character recognition.

Next, computer 212 determines the layout of the document (operation 226) based on the calculated features, as well as spatial constraints and grammatical constraints. For example, the layout may be determined using constraint-based optimization based on the spatial constraints and the grammatical constraints. These spatial and grammatical constraints may be associated with different documents (or different versions of the documents) in the set of documents. Alternatively, electronic device 210 may optionally provide (operation 218) and computer 212 may optionally receive (operation 220) the identifier (such as the user's Social Security number), which is then optionally used by computer 212 to select the initial layout (operation 222) of the document based on the identifier. This initial layout may specify the spatial and the grammatical constraints used when determining the layout of the document (operation 226).

As noted previously, computer 212 may optionally perform one or more additional operations (operation 228). For example, computer 212 may extract the content from the image based on the determined layout. Then, computer 212 may populate one or more fields in a form (which may correspond to the document) and/or may present the document. In particular, computer 212 may provide the document to electronic device 210, which then displays the document to the user.

Alternatively, computer 212 may: receive the content associated with the document from the user; populate fields in the form with the content; and present the form with the determined layout (e.g., by providing the document to electronic device 210).

In addition, computer 212 may request feedback from a user about the determined layout, and may receive the feedback from the user. As noted previously, this may make it easier for the user to provide the feedback because the information (the extracted content and/or the determined layout) is in a familiar format, i.e., the same one used in the version of the document that the user possesses.

In some embodiments of method 100 (FIGS. 1 and 2), there may be additional or fewer operations. Moreover, the order of the operations may be changed, and/or two or more operations may be combined into a single operation. For example, optionally receiving the identifier in operation 112 in FIG. 1 and optionally selecting the initial layout of the document in operation 114 in FIG. 1 may occur after performing the image analysis on the image in operation 116 in FIG. 1.

In an exemplary embodiment, the image-analysis technique is used to simplify data entry of income-tax information from an income-tax form (such as a W2 form). In particular, constraint-based optimization based on spatial and grammatical constraints associated with the income-tax form are used to determine the layout of the income-tax form from an image of the income-tax form. After a user confirms the determined layout, content in the income-tax document can be accurately extracted for subsequent use, e.g., in preparing an income-tax return for the user. Alternatively, the user may provide the content in a current version of the document (in these embodiments, the image may be associated with a previous version of the document).

Figure 3:
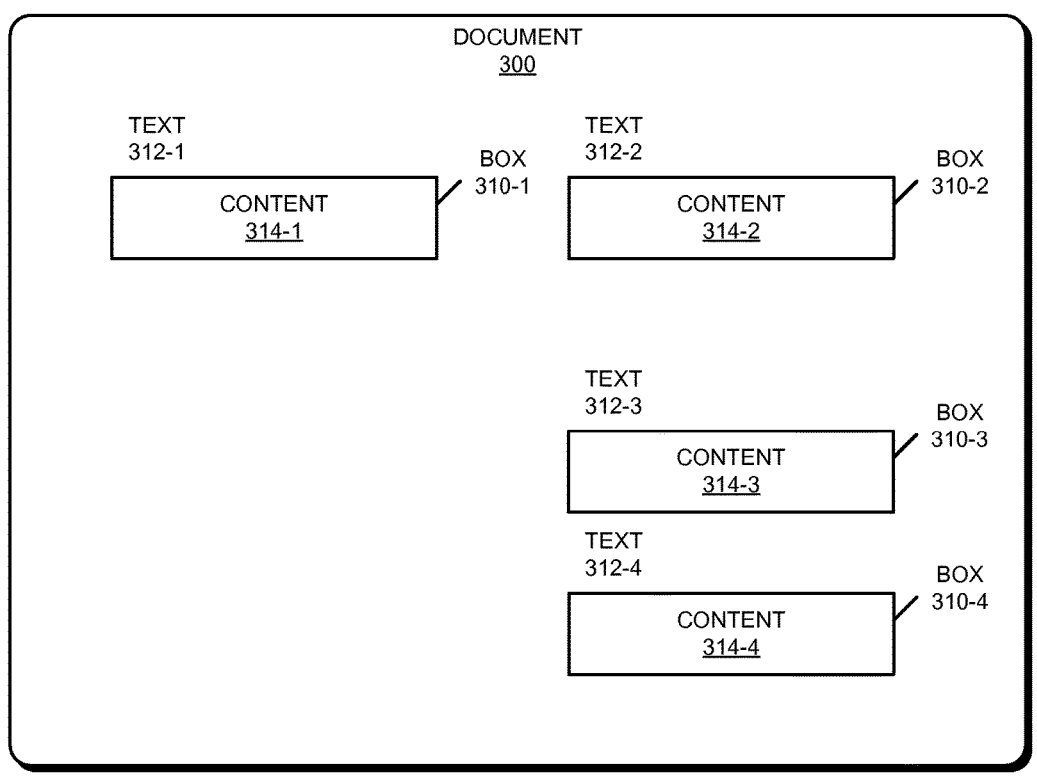
FIG. 3 is a drawing illustrating an income-tax document in accordance with an embodiment of the present disclosure.

This is shown in FIG. 3, which presents a drawing of an income-tax document 300. This income-tax document includes boxes (or fields) 310, associated text (or titles) 312, and content 314 in at least some of boxes 310. Note that there are spatial relationships (such as relative positions) between boxes 310, and between text 312 and boxes 310. These specify spatial constraints associated with income-tax document 300. Similarly, there are grammatical constraints on text 312 in income-tax document 300. For example, text 312 adjacent or proximate to boxes 310 may be restricted or constrained to be one of: b employee's Social Security number; c employer Identification Number; d employer's name address and ZIP code; e control number; f employee's first name and initial; last name; employee's address and ZIP code; 1 wages, tips, and other compensation; 2 Federal income tax withheld; 3 Social Security wages; 4 Social Security withheld; 5 Medicare wages and tips; 6 Medicare withheld; 7 Social Security tips; 8 allocated tips; 9 advanced EIC payment; 10 dependent care; 11 non-qualified plans; 12a; 12b; 12c; 12d; 13; 14 other; 15 state employer's state ID number; 16 state wages, tips, etc.; 17 state income tax; 18 local wages, tips, etc.; 19 local income tax; and 20 locality name.

These spatial and grammatical constraints can be used when determining the layout of income-tax document 300 from an image of income-tax document 300 that is provided by the user. As described previously, the spatial and grammatical constraints may be predetermined for a set of income-tax documents (including those with different layouts for the same type of document). Then, when determining the layout, the various spatial and grammatical constraints may be used, in conjunction with features calculated from the image of income-tax document 300 during image processing, to uniquely determine the layout of income-tax document 300. Alternatively or additionally, the user may provide additional information (such as their Social Security number) that is used to determine an initial layout of income-tax document 300. For example, the user's Social Security number may be used to look up the layout of the income-tax document in one or more previous years. The initial layout of the one or more previous versions of the income-tax document may be used to significantly simplify determination of the layout of income-tax document 300. In particular, the spatial and grammatical constraints associated with the one or more previous versions of the income-tax document may be used to simplify the 'search' space, for example, by restricting the number of possible documents in the set of documents, or by reducing the set of documents to the document. In some embodiments, the identifier is used to look up the image of income-tax document 300, which is from an earlier time interval (such as a previous year).

Once the layout of income-tax document 300 is determined, it may be verified by the user and/or used to accurately extract content 314 for use in subsequent calculations, such as in preparing an income-tax return for the user. As noted previously, by using the determined layout, it may be easier for the user to confirm the accuracy of extracted content 314 (or content that is provided by the user) because this information can be presented to the user in a context that matches the format of the original version or copy of income-tax document 300 that the user has.

In a variation on the preceding embodiments, the user may provide the identifier, such as their Employer Identification Number. Based on this identifier, an image of the W2 form may be accessed. For example, the user may have separately provided an image of their W2 form, and this may be accessed by matching the user name and/or the Employer Identification Number on the W2 form (which may also have been provided by the user). Alternatively, the identifier may be used to look up an image of a previous version of the W2 form, which is stored by the computer system.

The computer system may then perform optical character recognition to identify all of the boxes, headings and table separators. Moreover, constraint-based optimization (which is sometimes referred to as 'constraint-based energy minimization') may be used to determine the layout of the W2 form based on the image. This image-processing technique may use the positions of the boxes, headings and the table separators to create an HTML table of the W2 form. Furthermore, the information or content from the user's W2 form may be used to populate this table. This content may be provided by the user, may be available in electronic form from other sources (such as accounting software that prepared the W2 form), or may be extracted from the image based on the determined layout. The end result is that the user sees a W2 form that is identical to the user's paper W2 form, both in terms of the data-field values and in the layout.

While the preceding discussion illustrated the image-analysis technique being used by an individual or a software application used by the individual, in other embodiments the image-analysis technique may be offered as a service to other software providers. Consequently, the image-analysis technique may be used with a wide variety of software, including: income-tax preparation software, accounting software, payroll software, software that includes a user interface, and other types of software which request data from users. Therefore, the document may include a wide variety of types of documents, including non-income-tax-related documents.

Figure 4:
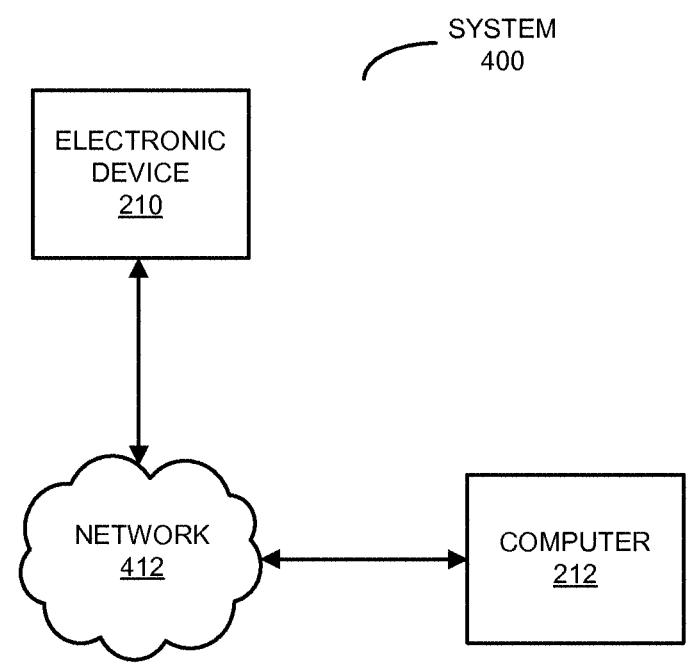
FIG. 4 is a block diagram illustrating a system that performs the method of FIGS. 1 and 2 in accordance with an embodiment of the present disclosure.

We now describe embodiments of a system and the computer system, and their use. FIG. 4 presents a block diagram illustrating a system 400 that can be used, in part, to perform operations in method 100 (FIGS. 1 and 2). In this system, during the image-analysis technique a user of electronic device 210 may use a software product, such as a software application that is resident on and that executes on electronic device 210. (Alternatively, the user may interact with a web page that is provided by computer 212 via network 412, and which is rendered by a web browser on electronic device 210. For example, at least a portion of the software application may be an application tool that is embedded in the web page, and which executes in a virtual environment of the web browser. Thus, the application tool may be provided to the user via a client-server architecture.) This software application may be a standalone application or a portion of another application that is resident on and which executes on electronic device 210 (such as a software application that is provided by computer 212 or that is installed and which executes on electronic device 210).

During the image-analysis technique, the user may use the software application (such as income-tax preparation software) to provide the image of the document to computer 212 via network 412. (Alternatively, computer 212 may look up the image based on the identifier of the user.) In response, computer 212 may perform image processing on the image to calculate the features. Then, using the calculated features, as well as spatial and grammatical constraints associated with one or more documents in a set of documents and/or with the initial layout specified by an identifier provided by the user (via electronic device 210 and network 412), computer 212 may determine the layout of the document.

Subsequently, computer 212 may perform one or more additional operations. For example, computer 212 may provide the determined layout to electronic device 210, which then displays information specifying the determined layout on a display. The user may confirm whether the determined layout matches that of the document, and this confirmation may be provided to computer 212 via network 412.

Furthermore, once the determined layout is verified, computer 212 may extract content from the image based on the calculated features and the determined layout. This extracted content may be used by the software application to generate additional results, such as to prepare an income-tax return for the user.

Alternatively, the user and/or electronic device 210 may provide the content to computer 212 via network 412, computer 212 may populate fields in a form using the determined layout, and computer 212 may present the form to the user (e.g., by communicating it to electronic device 210 via network 412), so that the user can review and verify the accuracy of the content in its original context (i.e., the determined layout of the document). Once the content is verified, it may be used by the software application to generate the additional results.

Note that information in system 400 may be stored at one or more locations in system 400 (i.e., locally or remotely). Moreover, because this data may be sensitive in nature, it may be encrypted. For example, stored data and/or data communicated via network 412 may be encrypted.

Figure 5:
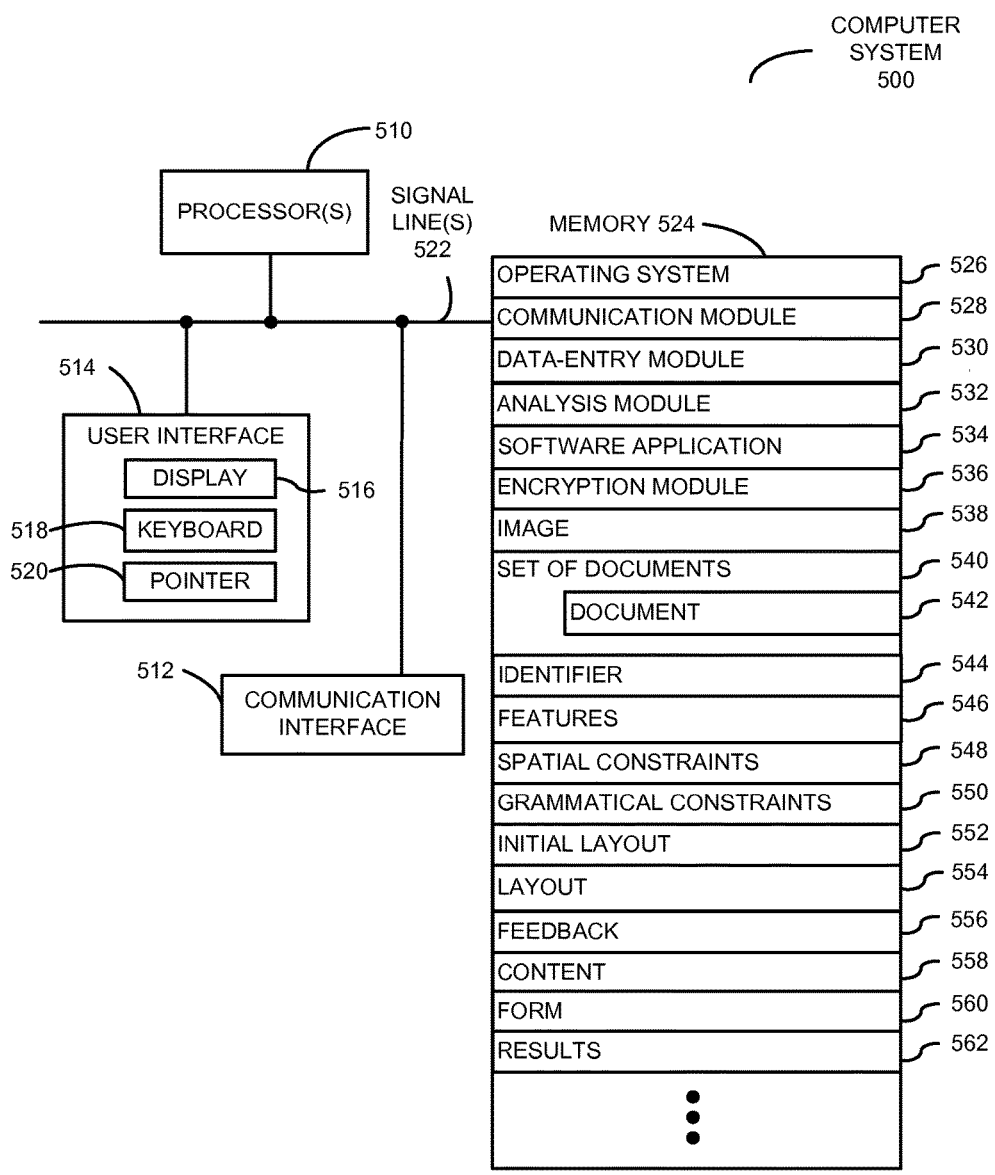
FIG. 5 is a block diagram illustrating a computer system that performs the method of FIGS. 1 and 2 in accordance with an embodiment of the present disclosure.

FIG. 5 presents a block diagram illustrating a computer system 500 that performs method 100 (FIGS. 1 and 2), such as computer 212 (FIGS. 2 and 4). Computer system 500 includes one or more processing units or processors 510, a communication interface 512, a user interface 514, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in computer system 500 may include volatile memory and/or non-volatile memory. More specifically, memory 524 may include: ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to computer system 500.

Memory 524 may also include multiple program modules (or sets of instructions), including: data-entry module 530 (or a set of instructions), analysis module 532 (or a set of instructions), software application 534 (or a set of instructions) and/or encryption module 536 (or a set of instructions). Note that one or more of these program modules (or sets of instructions) may constitute a computer-program mechanism.

During the image-analysis technique, data-entry module 530 may receive an image 538 of a document 542 (such as a W2 form) in a set of documents 540. This image may be received via communication interface 512 and communication module 528, or it may be accessed or looked up based on an identifier 544 of the user (such as the user's Social Security number).

Then, analysis module 532 may perform image processing on image 538 to calculate features 546. Then, using features 546, as well as spatial constraints 548 and grammatical constraints 550 associated with one or more documents in set of documents 540 and/or with initial layout 552 specified by identifier 544, analysis module 532 may determine layout 554 of document 542.

Subsequently, data-entry module 530 may provide layout 554 to the user for verification via communication module 528 and communication interface 512. The user may provide feedback 556 about layout 554 via communication interface 512 and communication module 528. In addition, analysis module 532 may use layout 554 to extract content 558 from image 538.

Alternatively, data-entry module 530 may receive content 558 from the user via communication interface 512 and communication module 528. This content may be populated into fields in form 560 having layout 554, and data-entry module 530 may provide form 560 to the user for verification via communication module 528 and communication interface 512. The user may provide feedback 556 about content 558 via communication interface 512 and communication module 528.

Once layout 554 and/or content 558 is verified, software application 534 may use content 558 to generate additional results 562, such as to prepare an income-tax return of the user.

Because information used in the image-analysis technique may be sensitive in nature, in some embodiments at least some of the data stored in memory 524 and/or at least some of the data communicated using communication module 528 is encrypted or decrypted using encryption module 536.

Instructions in the various modules in memory 524 may be implemented in: a high-level procedural language, an object-oriented programming language, and/or in an assembly or machine language. Note that the programming language may be compiled or interpreted, e.g., configurable or configured, to be executed by the one or more processors 510.

Although computer system 500 is illustrated as having a number of discrete items, FIG. 5 is intended to be a functional description of the various features that may be present in computer system 500 rather than a structural schematic of the embodiments described herein. In some embodiments, some or all of the functionality of computer system 500 may be implemented in one or more application-specific integrated circuits (ASICs) and/or one or more digital signal processors (DSPs).

Computer system 500, as well as electronic devices, computers and servers in system 500, may include one of a variety of devices capable of manipulating computer-readable data or communicating such data between two or more computing systems over a network, including: a personal computer, a laptop computer, a tablet computer, a mainframe computer, a portable electronic device (such as a cellular telephone or PDA), a server, a point-of-sale terminal and/or a client computer (in a client-server architecture). Moreover, network 412 (FIG. 4) may include: the Internet, World Wide Web (WWW), an intranet, a cellular-telephone network, LAN, WAN, MAN, or a combination of networks, or other technology enabling communication between computing systems.

Electronic device 210 (FIGS. 2 and 4), computer 212 (FIGS. 2 and 4), system 400 (FIG. 4), and/or computer system 500 may include fewer components or additional components. Moreover, two or more components may be combined into a single component, and/or a position of one or more components may be changed. In some embodiments, the functionality of electronic device 210 (FIGS. 2 and 4), computer 212 (FIGS. 2 and 4), system 400 (FIG. 4) and/or computer system 500 may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for determining a layout of information in a document, the method comprising:
receiving an image of the document;
receiving an identifier of a user;

prior to performing an image analysis on the image, selecting an initial layout of the document based on the identifier;

performing the image analysis on the image to calculate features, wherein the features include binary robust invariant scalable keypoints or fast retina keypoints;

determining a layout of the document based on the calculated features, as well as spatial constraints and grammatical constraints associated with the initial layout, wherein the layout specifies locations of content in the document;

sending information specifying the determined layout to the user;

requesting feedback regarding the determined layout;

receiving the requested feedback, wherein the feedback confirms that the determined layout matches the document;

populating fields in a form with the content, wherein the form matches the determined layout such that the content appears in the specified locations in the form; and sending the form for presentation on a display in the determined layout to the user.

2. The method of claim 1, wherein the image analysis includes optical character recognition.

3. The method of claim 1, wherein determining the layout involves constraint-based optimization based on the spatial constraints and the grammatical constraints.

4. The method of claim 1, wherein determining the layout involves calculating a distance metric based on the spatial constraints and the grammatical constraints.

5. The method of claim 4, wherein the distance metric includes a Mahalanobis distance metric.

6. The method of claim 1, wherein the document includes an income-tax document.

7. The method of claim 6, wherein the spatial constraints are associated with boxes in the income-tax document; and wherein the grammatical constraints are associated with alphanumeric characters proximate to the boxes.

8. The method of claim 1, wherein, after determining the layout, the method further comprises extracting the content from the image based on the determined layout.

9. A non-transitory computer-readable storage medium comprising executable instructions that when executed by a processor of a computer system, cause the computer system to perform a method to determine a layout of a document, the method comprising:

receiving an image of the document;

receiving an identifier of a user;

prior to performing an image analysis on the image, selecting an initial layout of the document based on the identifier;

performing the image analysis on the image to calculate features, wherein the features include binary robust invariant scalable keypoints or fast retina keypoints;

determining a layout of the document based on the calculated features, as well as spatial constraints and grammatical constraints associated with the initial layout, wherein the layout specifies locations of content in the document;

sending information specifying the determined layout to the user;

requesting feedback from the user regarding the determined layout;

receiving the requested feedback, wherein the feedback confirms that the determined layout matches the document;

populating fields in a form with the content, wherein the form matches the determined layout such that the content appears in the specified locations in the form; and sending the form for presentation on a display in the determined layout to the user.

10. The non-transitory computer-readable storage medium of claim 9, wherein the image analysis includes optical character recognition.

11. The non-transitory computer-readable storage medium of claim 9, wherein determining the layout involves constraint-based optimization based on the spatial constraints and the grammatical constraints.

12. The non-transitory computer-readable storage medium of claim 9, wherein determining the layout involves calculating a distance metric based on the spatial constraints and the grammatical constraints.

13. The non-transitory computer-readable storage medium of claim 9, wherein the document includes an income-tax document;

wherein the spatial constraints are associated with boxes in the income-tax document; and wherein the grammatical constraints are associated with alphanumeric characters proximate to the boxes.

14. The non-transitory computer-readable storage medium of claim 9, wherein, the method further comprises extracting the content from the image based on the determined layout.

15. A computer system, comprising:

a processor;

memory; and a program module, wherein the program module is stored in the memory and configurable to be executed by the processor to cause the computer system to perform a method to determine a layout of a document, the method comprising:

receiving an image of the document;

receiving an identifier of a user;

prior to performing an image analysis on the image, selecting an initial layout of the document based on the identifier;

performing the image analysis on the image to calculate features, wherein the features include binary robust invariant scalable keypoints or fast retina keypoints;

determining the a layout of the document based on the calculated features, as well as spatial constraints and grammatical constraints associated with the initial layout, wherein the layout specifies locations of content in the document;

sending information specifying the determined layout to the user;

requesting feedback from the user regarding the determined layout;

receiving the requested feedback, wherein the feedback confirms that the determined layout matches the document;

populating fields in a form with the content, wherein the form matches the determined layout such that the content appears in the specified locations in the form; and sending the form for presentation on a display in the determined layout to the user.

16. The computer system of claim 15, wherein the image analysis includes optical character recognition.

17. The computer system of claim 15, wherein determining the layout involves constraint-based optimization based on the spatial constraints and the grammatical constraints.

18. The computer system of claim 15, wherein determining the layout involves calculating a distance metric based on the spatial constraints and the grammatical constraints.

19. The computer system of claim 18, wherein the distance metric includes a Mahalanobis distance metric.

20. The computer system of claim 15, wherein, after determining the layout, the method further comprises extracting the content from the image based on the determined layout.

* * * * *